March 7, 1933. A. H. NOYES 1,899,978
TANK OUTLET VALVE
Filed Sept. 20, 1929
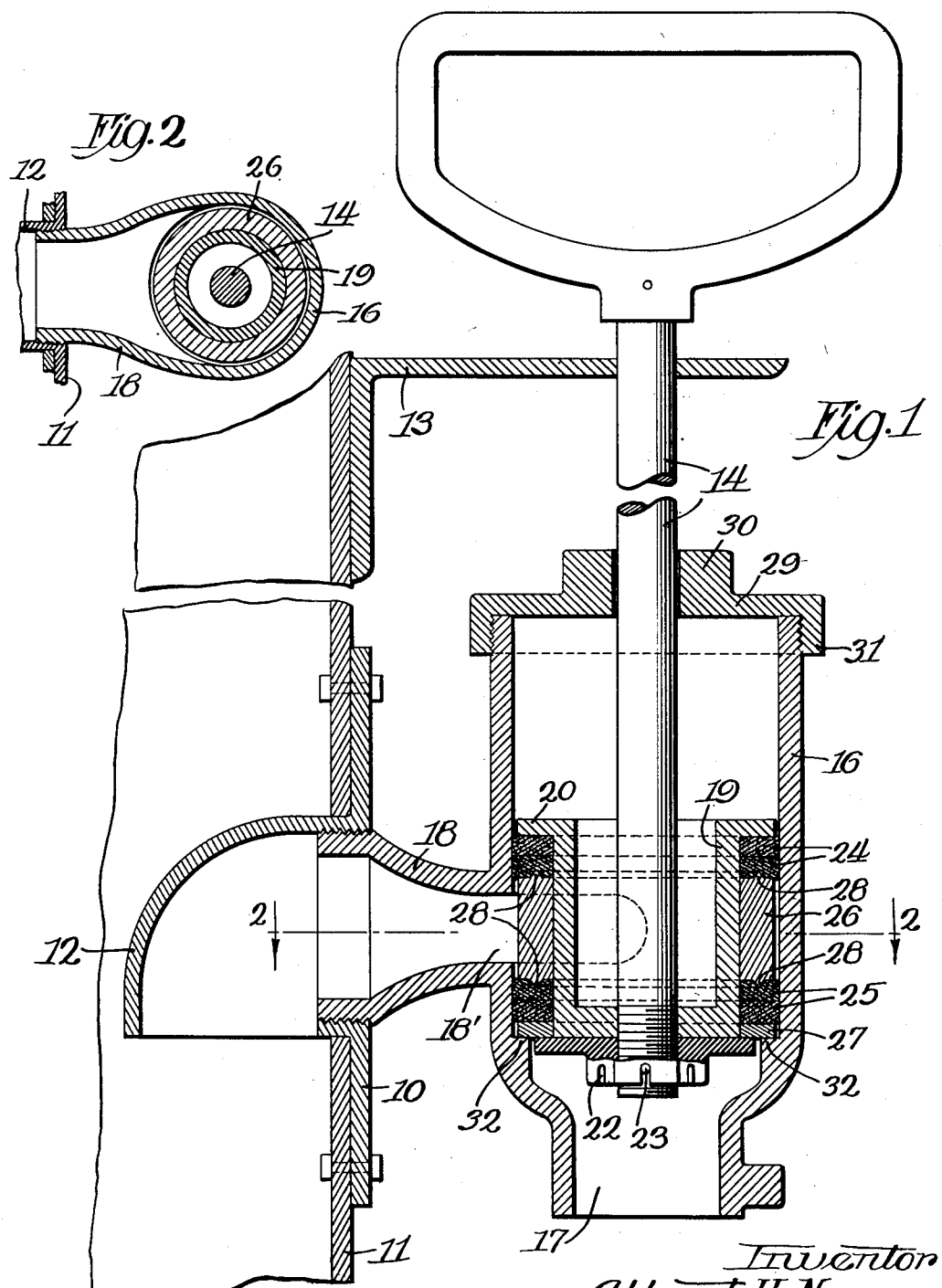
Inventor
Albert H. Noyes
By Fisher, Clapp, Soans & Pond, Attys.

Patented Mar. 7, 1933

1,899,978

UNITED STATES PATENT OFFICE

ALBERT H. NOYES, OF CHICAGO, ILLINOIS, ASSIGNOR TO HILLS-McCANNA COMPANY, OF CHICAGO, ILLINOIS, A CORPORATION OF ILLINOIS

TANK OUTLET VALVE

Application filed September 20, 1929. Serial No. 394,063.

The invention relates to outlet valves for tanks and seeks to provide an improved construction which is particularly adapted for draining brine from the tanks of refrigerator cars. The invention provides an improved form of packed piston valve which is of simple, durable construction, which will effectively prevent leaking of brine on the railroad right-of-way and, which, when closed, will exclude liquid from the valve casing.

The invention consists in the features of improvement hereinafter set forth, illustrated in the preferred form in the accompanying drawing, and more particularly pointed out in the appended claims.

In the drawing:

Fig. 1 is an enlarged vertical section of the improved valve.

Fig. 2 is a horizontal section on the line 2—2 of Fig. 1, reduced in scale.

A fitting comprising a disk or plate 10 is riveted to the tank 11 at its drain outlet and is preferably provided with an integral guard 12 which is open at its bottom and projects inwardly into the tank. The car or tank is also provided with a suitable supporting bracket 13 which guides a vertically reciprocating valve rod 14 having a handle 15 at its upper end.

The improved valve comprises a cylindrical casing 16 having a contracted, lower outlet end 17. On one side, the valve casing is provided with an integral nipple or inlet extension 18 which is threaded into the fitting 10 and supports the valve casing. Preferably, the inlet section 18 of the valve casing is contracted vertically and expanded horizontally.

The piston valve comprises a cup-shaped body 19 having a laterally projecting flange 20 at its upper end and a threaded opening in its lower end by which it is rigidly fixed to the threaded lower end of the valve rod 14. The lower end of the valve rod provides a projecting stud on the lower end of the valve body 19, and a plate or disk 21 is threaded thereon into engagement with the lower face of the valve body. The central portion of the plate is thickened and provides a hexshaped nut 22 which is slotted to engage a pin 23 extending through the valve rod. The plate or disk 21 thus in effect forms a lock-nut for the valve body. It is also noted that this plate is larger than the valve body and projects beyond the side wall thereof.

Upper and lower packing rings 24 and 25, an intermediate sleeve 26, and a follower ring 27 are mounted on the cylindrical valve body 19, with the upper packing ring or rings 24 engaging the flange 20 and the follower ring 27 engaging the projecting edge of the plate or disk 21. The sleeve 26 and follower ring 27 are solid, that is to say, they are not split packing rings. Indeed, as shown, the sleeve and follower ring and the flange 20 of the valve body are slightly smaller in diameter than the bore of the valve casing. These parts and the disk or plate 21 cooperate to compress the packing rings 24 and 25 in axial direction, and so tend to expand them radially to insure the snug engagement of the packing rings with the inner cylindrical surface of the valve casing.

To effectively expand the leather packing rings, certain of the parts engaging the horizontal faces of the rings, and preferably the end faces of the intermediate sleeve 26, are provided with annular ribs 28. These ribs are rounded or V-shaped in section and, when axial pressure is applied, these ribs indent the packing rings and expand them radially into snug engagement with the cylindrical walls of the valve casing and the body of the plunger or piston valve. If desired, similar ribs could be formed upon the packing engaging faces of the flange 20 and follower ring 27.

A cap 29 having a thickened guiding portion 30 for the valve rod 14 is removably mounted on the upper end of the valve casing and is preferably provided with a depending, internally threaded flange 31 which engages the upper screw-threaded portion of the valve casing. By means of the valve rod and handle, the valve may be readily reciprocated in the valve casing to its open and closed positions.

It is noted that the follower ring 27 on the valve body projects beyond the edge of the disk or plate 21 and, in the closed position of the valve, engages an annular shoulder or seat 32 formed upon the valve casing below the inlet port 18'. In its closed position, as shown, the packing rings 24 and 25 are arranged respectively above and below and closely adjacent the inlet port 18'. When the valve is forced to closed position, the engagement of the follower ring 27 with the shoulder or seat 32 applies additional pressure to expand the packing rings.

By laterally expanding and vertically contracting the inlet port 18', a relatively short plunger can be employed and provided, as described, with packing rings disposed above and below the port when the valve is closed. The arrangement effectively prevents leaking through the outlet 17 of the valve casing and also prevents liquid from passing into the body of the valve casing above the piston or plunger where, in cold weather, it might freeze and interfere with the operation of the valve. Also, the need of a stuffing box to pack the valve rod is avoided.

Changes may be made in the details set forth without departure from the scope of the appended claims.

I claim as my invention:

1. A tank discharge valve comprising a valve casing having an outlet at its lower end and a lateral extension adapted to be connected to the tank outlet and provided with an inlet port, and a piston valve slidable in said casing and comprising a cylindrical body having a flange at its upper end, upper and lower packing rings, an intermediate sleeve and a follower ring mounted on the cylindrical valve body and a plate secured to the lower end of the valve body and engaging the follower ring to axially compress and radially expand the packing rings, said casing having a stop shoulder for engaging the follower ring to arrest the closing movement of the valve with the packing rings above and below said inlet port, substantially as described.

2. A tank discharge valve comprising a valve casing having an outlet at its lower end and a lateral extension provided with an inlet port, and a piston valve slidable in said casing and comprising a cylindrical body having a flange at its upper end and a threaded stud projecting from its lower end, a plate threaded on said stud and abutting against the lower face of the valve body, upper and lower packing rings of yielding material, an intermediate spacing sleeve and a follower ring mounted on the cylindrical valve body with the upper packing ring engaging said flange and the follower ring engaging the projecting edge of said plate, said casing having a stop shoulder for engaging the follower ring to arrest the closing movement of the value with the packing rings disposed above and below said inlet port, substantially as described.

3. A tank discharge valve comprising a valve casing having an outlet at its lower end and a lateral extension provided with an inlet port, and a piston valve slidable in said casing, upper and lower packing rings of yielding material, an intermediate spacing sleeve and a follower ring mounted on the cylindrical valve body, the packing rings being disposed above and below said inlet port in the closed position of the valve, and means for applying pressure in axial direction to the packing rings and sleeve, the latter having beveled faces on its ends for expanding the packing rings, substantially as described.

4. A tank discharge valve comprising a valve casing having an outlet at its lower end and a lateral extension provided with an inlet port, and a piston valve slidable in said casing and comprising a cylindrical body having a flange at its upper end and a threaded stud projecting from its lower end, a plate threaded on said stud and abutting against the lower face of the valve body, upper and lower packing rings of yielding material, an intermediate spacing sleeve and a follower ring mounted on the cylindrical valve body with the upper packing ring engaging said flange and the follower ring engaging the projecting edge of said plate and with the packing rings disposed above and below said inlet port in the closed position of the valve, said flange, sleeve and follower ring being slightly smaller than the bore of the valve casing and certain of said parts having ribs for engaging and expanding the packing rings into snug engagement with the wall of the casing, substantially as described.

5. A tank discharge valve comprising a valve casing having an outlet at its lower end and a lateral extension provided with an inlet port, and a piston valve slidable in said casing, upper and lower packing rings of yielding material disposed above and below the inlet port when the valve is closed, an intermediate spacing sleeve and a follower ring mounted on the valve body and arranged to apply pressure to the packing rings, certain of said pressure-applying parts having ribs for engaging and expanding the packing rings, substantially as described.

6. In a tank outlet valve, a cylindrical valve casing having an outlet at its lower end and a vertically contracted and laterally expanded inlet port in its side wall, a piston valve slidable in said casing having upper and lower packing rings disposed above and below the inlet port in the closed position of the valve, an intermediate spacing sleeve and a follower ring mounted in the valve body and arranged to vertically compress and laterally expand the packing rings, said casing having a shoulder below the inlet port for engaging the follower ring in the closed position of the valve, substantially as described.

7. In a tank outlet valve, a fitting secured to the tank, a valve casing having an outlet at its lower end and a lateral extension provided with an inlet port and threaded ino said fitting to thereby support the valve, a piston valve slidable in said casing, upper and lower packing rings on the valve body, the casing having a shoulder below the inlet port for arresting the valve in closed position with the packing rings above and below the inlet port, a cap removably mounted on the upper end of the casing and a valve rod extending through said cap and fixed to the valve body, substantially as described.

8. A tank outlet valve comprising a casing having an outlet in its lower end and an inlet port in its side wall, a piston valve in said casing having a cup-shaped, cylindrical body provided with a flange at its upper end, a valve rod extending through the lower end of the valve body and providing a threaded extension, a plate threaded on said extension and projecting beyond the valve body, and upper and lower packing rings, an intermediate sleeve and a follower ring mounted on the cylindrical valve body with the upper packing ring engaging said flange and the follower ring engaging the projecting edge of said plate, said casing having a stop shoulder for engaging the projecting portion of the follower ring to arrest the closing movement of the valve with the packing rings above and below the inlet port, substantially as described.

9. A tank outlet valve comprising a casing having an outlet at its lower end, an inlet port in its side wall, a sliding piston valve in said casing having a cylindrical body provided with a flange at its upper end, a valve rod secured to the valve body, upper and lower packing rings of yielding material, an intermediate sleeve and a follower ring slidably mounted on the cylindrical valve body and arranged to apply pressure to the packing rings, certain of said pressure-applying parts having ribs for engaging and expanding the packing rings, and a plate removably secured to the lower end of the valve body and engaging the follower ring, said casing having a stop shoulder for engaging the follower ring upon the closing movement of the valve to apply pressure and expand the packing rings, substantially as described.

ALBERT H. NOYES.

CERTIFICATE OF CORRECTION.

Patent No. 1,899,978.   March 7, 1933.

ALBEBT H. NOYES.

It is hereby certified that error appears in the printed specification of the above numbered patent requiring correction as follows: Page 2, lines 49, 70, 84 and 108, claims 2, 3, 4 and 5, respectively, after "extension" insert the words "adapted to be connected to the tank outlet and"; same page, line 64, claim 2, for "value" read "valve"; and that the said Letters Patent should be read with these corrections therein that the same may conform to the record of the case in the Patent Office.

Signed and sealed this 9th day of May, A. D. 1933.

M. J. Moore.
Acting Commissioner of Patents.

(Seal)